United States Patent
Ranasinghe et al.

(10) Patent No.: US 8,015,822 B2
(45) Date of Patent: Sep. 13, 2011

(54) METHOD FOR CONTROLLING AN EXHAUST GAS RECIRCULATION SYSTEM

(75) Inventors: Jatila Ranasinghe, Simpsonville, SC (US); Elizabeth F. Brown, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 433 days.

(21) Appl. No.: 12/275,318

(22) Filed: Nov. 21, 2008

(65) Prior Publication Data

US 2010/0126181 A1  May 27, 2010

(51) Int. Cl.
*F02C 1/00* (2006.01)
(52) U.S. Cl. ............... 60/772; 60/39.5; 60/785
(58) Field of Classification Search ............ 60/39.12, 60/39.5, 39.52, 772, 785
See application file for complete search history.

(56) References Cited

U.S. PATENT DOCUMENTS

| | | | | |
|---|---|---|---|---|
| 6,526,757 | B2 * | 3/2003 | Mackay | 60/773 |
| 2002/0083712 | A1 * | 7/2002 | Tomlinson et al. | 60/775 |
| 2004/0244381 | A1 * | 12/2004 | Becker | 60/772 |
| 2005/0028529 | A1 * | 2/2005 | Bartlett et al. | 60/772 |
| 2008/0309087 | A1 * | 12/2008 | Evulet et al. | 290/52 |
| 2009/0218821 | A1 * | 9/2009 | ElKady et al. | 290/52 |

* cited by examiner

*Primary Examiner* — Louis Casaregola
*Assistant Examiner* — Phutthiwat Wongwian
(74) *Attorney, Agent, or Firm* — Dale J. Davis; Ernest G. Cusick; Frank A. Landgraff (57) ABSTRACT

The present invention takes the form of a method and system that may reduce the level of SOx emissions by recirculating a portion of the exhaust of at least one turbomachine; the portion of exhaust may be mixed with the inlet air prior to re-entering the turbomachine. The present invention may incorporate an inlet bleed heat system to reduce the likelihood of the liquid products forming from SOx emissions. Here, a method may maintain a temperature of the inlet fluid above a condensation temperature.

16 Claims, 4 Drawing Sheets

METHOD FOR CONTROLLING AN EXHAUST GAS RECIRCULATION SYSTEM

This application is related to commonly-assigned U.S. patent application Ser. No. 11/928,038, filed Oct. 30, 2007; U.S. patent application Ser. No. 11/953,556, filed Dec. 10, 2007; and U.S. patent application Ser. No. 11/953,525, filed Dec. 10, 2007.

BACKGROUND OF THE INVENTION

The present invention relates to an exhaust gas recirculation system, and more particularly to a method and system for controlling an exhaust gas recirculation system system.

There is a growing concern over the long-term effects of Nitrogen Oxides (hereinafter NOx) and Carbon Dioxide (hereinafter "$CO_2$") and Sulfur Oxides such as, but not limiting of, $SO_2$ and $SO_3$ (hereinafter "SOx") emissions on the environment. The allowable levels of emissions that may be emitted by a turbomachine, such as a gas turbine, are heavily regulated. Operators of turbomachines desire methods of reducing the levels of NOx, $CO_2$, and SOx emitted.

Exhaust gas recirculation (EGR) generally involves recirculating a portion of the emitted exhaust through an inlet portion of the turbomachine. The exhaust is then mixed with the incoming airflow prior to combustion. The EGR process facilitates the removal and sequestration of concentrated $CO_2$, and may also reduces the NOx and SOx emission levels.

Generally, the EGR process concentrates $CO_2$ in the exhaust stream, and reduces the exhaust stream volume such that $CO_2$ may be more easily sequestered in a downstream process. However, there is a similar impact of concentrating any sulfur contained in the fuel. Sulfur reacts with oxygen to produce SOx in the exhaust stream, which upon recirculation becomes more concentrated. The saturated and cooled exhaust stream is mixed with ambient air, creating an inlet fluid, inside the gas turbine inlet. Here a generated condensate drops out containing sulfuric acid, which may corrode compressor blades if carried downstream into the compressor inlet.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the gas turbine.

There are a few concerns with the currently known EGR systems. Impurities and moisture within the exhaust gas prevent utilizing a simple re-circulating loop to reduce the generation of emissions, such as SOx emissions. Turbine fouling, corrosion, and accelerated wear of internal turbomachine components would result from introducing the exhaust gas directly to an inlet portion of the turbomachine. As a result, the diverted exhaust gas should be treated prior to blending with the inlet air.

For the foregoing reasons, there is a need for a method for controlling an EGR system. The method should reduce the level of the liquid products derived from SOx emissions. The method should seek to maintain a temperature of the inlet fluid above a condensation temperature.

BRIEF DESCRIPTION OF THE INVENTION

In accordance with an embodiment of the present invention, a method of reducing a likelihood of a liquid product forming within an exhaust stream, wherein the exhaust stream is generated by a turbomachine; the method comprising: providing a turbomachine comprising: an inlet bleed heat (IBH) system for increasing a temperature of an inlet fluid, wherein the inlet fluid comprises an inlet air and an exhaust stream; wherein the IBH system comprises at least one valve; a compressor which receives and compresses an inlet fluid from the inlet system; providing at least one exhaust gas recirculation (EGR) system comprising at least one of: an EGR skid, and an EGR flow control device; utilizing the IBH system to increase a temperature of the inlet fluid above a condensation temperature; and modulating the at least one flow control device to adjust a flowrate of the exhaust stream.

BRIEF DESCRIPTION OF THE DRAWINGS

FIGS. 2A and 2B, collectively FIG. 2, is a flowchart illustrating a method of reducing the level of the liquid products derived from SOx emissions.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention has the technical effect of controlling a system for reducing the concentrations of SOx, NOx, concentrated $CO_2$, and other harmful constituents, all of which may be within a portion of the exhaust (hereinafter "exhaust stream", or the like). The portion of exhaust may then be mixed with the inlet air prior to re-entering the turbomachine, without affecting reliability and availability of the unit. An inlet fluid may be considered the mixture of the recirculated exhaust stream and the inlet air. The EGR system may function while the turbomachine is operating in a mode such as, but not limiting of: spinning reserve, part load, base load, or combinations thereof.

An embodiment of the present invention takes the form of a system has the technical effect of reducing the level of the liquid products derived from SOx emissions. The present invention provides a method that seeks to maintain a temperature of the inlet fluid above a condensation temperature.

The present invention may be applied to the variety of turbomachines that produce a gaseous fluid, such as, but not limiting of, a heavy-duty gas turbine; an aero-derivative gas turbine; or the like. An embodiment of the present invention may be applied to either a single gas turbine or a plurality of turbomachines. An embodiment of the present invention may be applied to a turbomachine operating in a simple cycle or a combined cycle configuration.

Generally, the exhaust gas recirculation system of an embodiment of the present invention comprises multiple elements. The configuration and sequence of the elements may be dictated by the composition of the exhaust gas and the type of cooling fluid used. In general, the steps comprising the exhaust gas recirculation process are: diversion, constituent reduction, and mixing.

Figure 1:
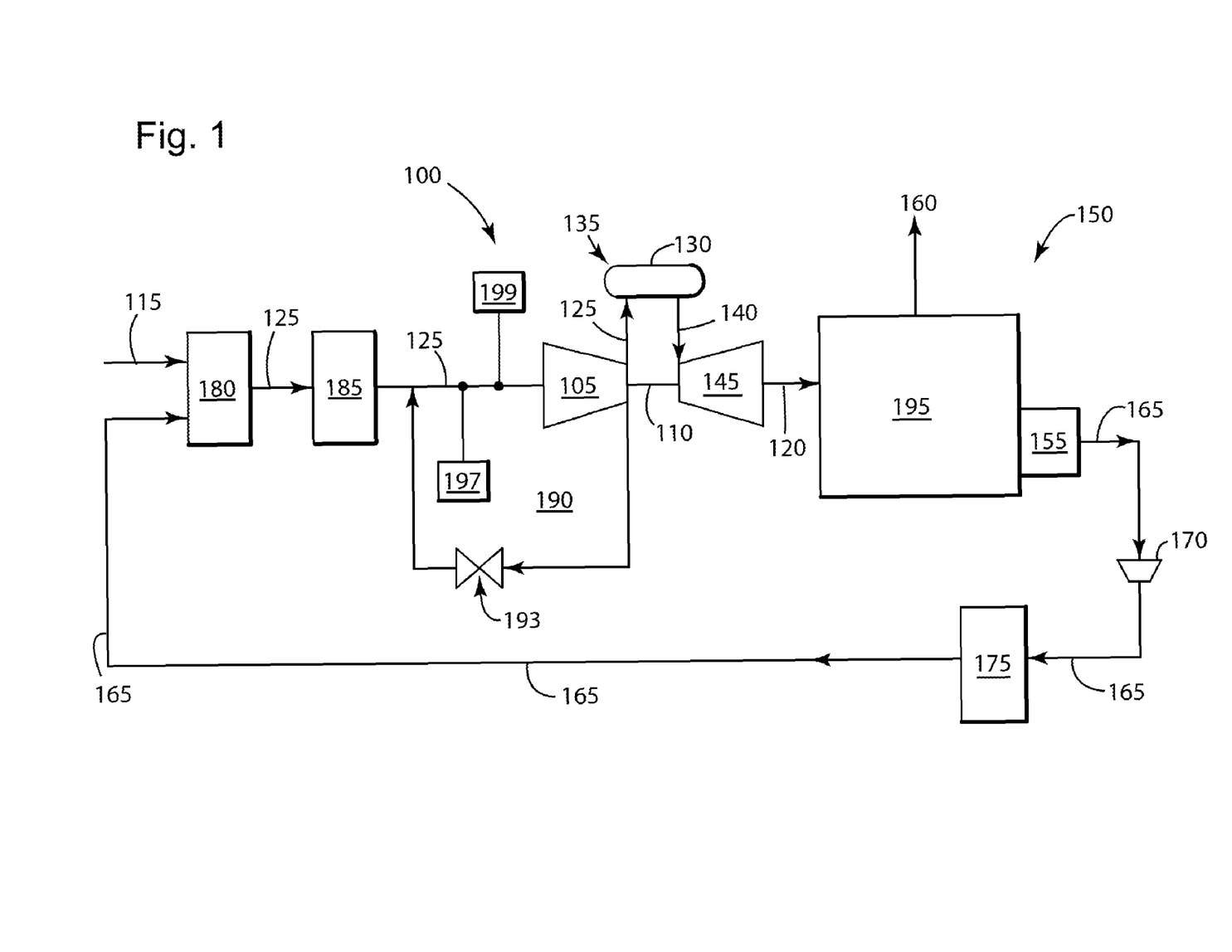
FIG. 1 is a schematic illustrating the environment in which an embodiment of the present invention operates.

Referring now to the Figures, where the various numbers represent like elements throughout the several views, FIG. 1 is a schematic illustrating the environment in which an embodiment of the present invention operates. FIG. 1 illustrates a site such as, but not limiting of a powerplant site, having a turbomachine 100, an EGR system 150, and a heat recovery steam generator (HRSG) 195. Alternatively, the present invention may be integrated with a site not having the HRSG 195.

In an embodiment of the present invention, the EGR skid 175 may use a fluid that may include: fresh water, seawater, or combinations thereof to cool the exhaust stream 165. An embodiment of the present invention may blend sea water and fresh water prior to introduction into the at least one EGR skid with the goal of minimizing the impact of the EGR skid fluid characteristics on the performance of the EGR system 150, The blended fluid may minimize the impact of variations in the seawater composition.

The elements of the present invention may be fabricated of any materials that can withstand the operating environment under which the exhaust gas recirculation system may function and operate.

As described below, an embodiment of the present invention may utilize at least one EGR skid 175 and an EGR flow control device 170 to recirculate a portion of the exhaust. The EGR skid 175 may take the form of at least one heat exchanger.

An embodiment of the present invention may incorporate an inlet bleed heat (IBH) system 190 of a turbomachine 100 with an EGR system 150. The IBH system 190 may be used in the present invention to maintain the temperature of the inlet fluid 125 above a condensation temperature. This may reduce the likelihood of the SOx condensing into a Sulfuric Acid within the inlet system of the turbomachine 100, which may lead to corrosion of components of a compressor 105 of the turbomachine 100.

The turbomachine 100 comprises a compressor 105 having a shaft 110. Generally, the inlet fluid 125 enters the compressor 105, is compressed and then discharged to a combustion system 130, where a fuel 135 such as, but not limiting of, natural gas is burned to provide high-energy combustion gases 140 which drive the turbine section 145. In the turbine section 145, the energy of the hot gases is converted into work, some of which is used to drive the compressor 105 through the shaft 110, with the remainder being available for useful work to drive a load (not illustrated). The total exhaust 120 may exit the turbine section 145 and enter a HRSG 195.

As illustrated in FIG. 1, the turbomachine 100 may also comprise an IBH 190. Generally, an IBH system 190 removes a portion of the compressed air in the compressor 105. This may occur for a few operational purposes. During the start-up of some turbomachines 100, a portion of the air being compressed may be removed to prevent compressor stall or compressor surge. Here, the IBH system 190 may be used to remove a portion of the compressed air to reduce the likelihood of those events.

The IBH system 190 may also be used to prevent icing on components of the compressor 105. Here, the compressed air that is extracted from the compressor 105 is recirculated to heat the incoming inlet air 115 above a temperature that may lead to icing of the components of the compressor 105.

An embodiment of the IBH system 190 may comprise at least one valve 193 and at least one IBH device 199. The at least one valve 193 serves to control the flow of compressed fluid that is extracted from the compressor 105. The at least one IBH device 199 may provide at least one measurement of: a wet-bulb temperature, dry-bulb temperature, specific humidity, relative humidity, or combinations thereof. In an embodiment of the present invention, the IBH device 199 may be located within an inlet section of the turbomachine 100.

The EGR system 150 comprises multiple elements. The configuration and sequence of these elements may be dictated by the composition of the exhaust stream 165 and the type of cooling fluid used by the components of the EGR system 150. Furthermore, alternate embodiments of the EGR system 150 may include additional or fewer components than the components described below. Therefore, various arrangements, and/or configurations, which differ from FIG. 1, may be integrated with an embodiment of the present invention.

As illustrated in FIG. 1, an embodiment of the EGR system 150 may comprise: an EGR damper 155, an EGR flow control device 170, an EGR skid 175, a mixing station 180, a mist eliminator 185, and at least one constituent feedback device 197.

In use, an embodiment of the EGR system 150 of the present invention may operate while the turbomachine 100 generates an exhaust stream 165. The EGR damper 155 may be positioned to allow for the desired flowrate of the exhaust stream 165, and the non-recirculated exhaust 160 may flow through an exhaust stack (not illustrated), or the like. The exhaust stream 165 may then flow downstream through the EGR flow control device 170, which may take the form of a fan, blower, or the like.

Next, the exhaust stream 165 may flow to the EGR skid 175. Here, the exhaust stream 165 may be cooled from a first temperature to a lower second temperature. The second temperature may allow for the reduction of some of the SOx emissions. The exhaust stream 165 may then flow to a mixing station 180, where the exhaust stream 165 may he mixed with the inlet air 115, forming the inlet fluid 125. During the mixing process, the temperature of the exhaust stream 165 may be reduced allowing for condensation. Next, the inlet fluid 125 may flow through a mist eliminator 185, which may reduce condensate droplets within the inlet fluid 125.

Next, the inlet fluid 125 may flow through an inlet section (not illustrated) of the turbomachine 100. Here, the IBH system 190 may increase the temperature of the inlet fluid 125 above to a temperature range that may prevent the inlet fluid 125 from condensing within the components of the compressor 105.

During the operation of the EGR system 150, a control system may receive operational data. This may include data on a level of at least one constituent within the inlet fluid 125 from at least one constituent feedback device 197. This may also include wet-bulb temperature data, dry-bulb temperature data, specific humidity data, relative humidity data which may be received from at least one IBH device 199, as described. The operational data may be used to control the operation of the turbomachine 100 and/or the EGR system 150.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

The present invention may include a control system, or the like, that has the technical effect of reducing the level of the liquid products derived from SOx emissions. The control system may receive data on the concentration of the at least one constituent from the at least one constituent feedback device 197. The control system may also receive data on the wet-bulb temperature, dry-bulb temperature, specific humidity, relative humidity, or the like from the at least one IBH device 199. Based in part of the received data, the control system may adjust to the operation of the EGR system 150 and/or the IBH system 190.

The control system of an embodiment of the present invention may be configured to automatically and/or continuously monitor the turbomachine 100 to determine whether the EGR system 150 should operate. Alternatively, the control system may be configured to require a user action to the initiate operation of the EGR system 150. An embodiment of the control system of the present invention may function as a stand-alone system. Alternatively, the control system may be integrated as a module, or the like, within a broader system, such as a turbine control or a plant control system.

Figure 2A:
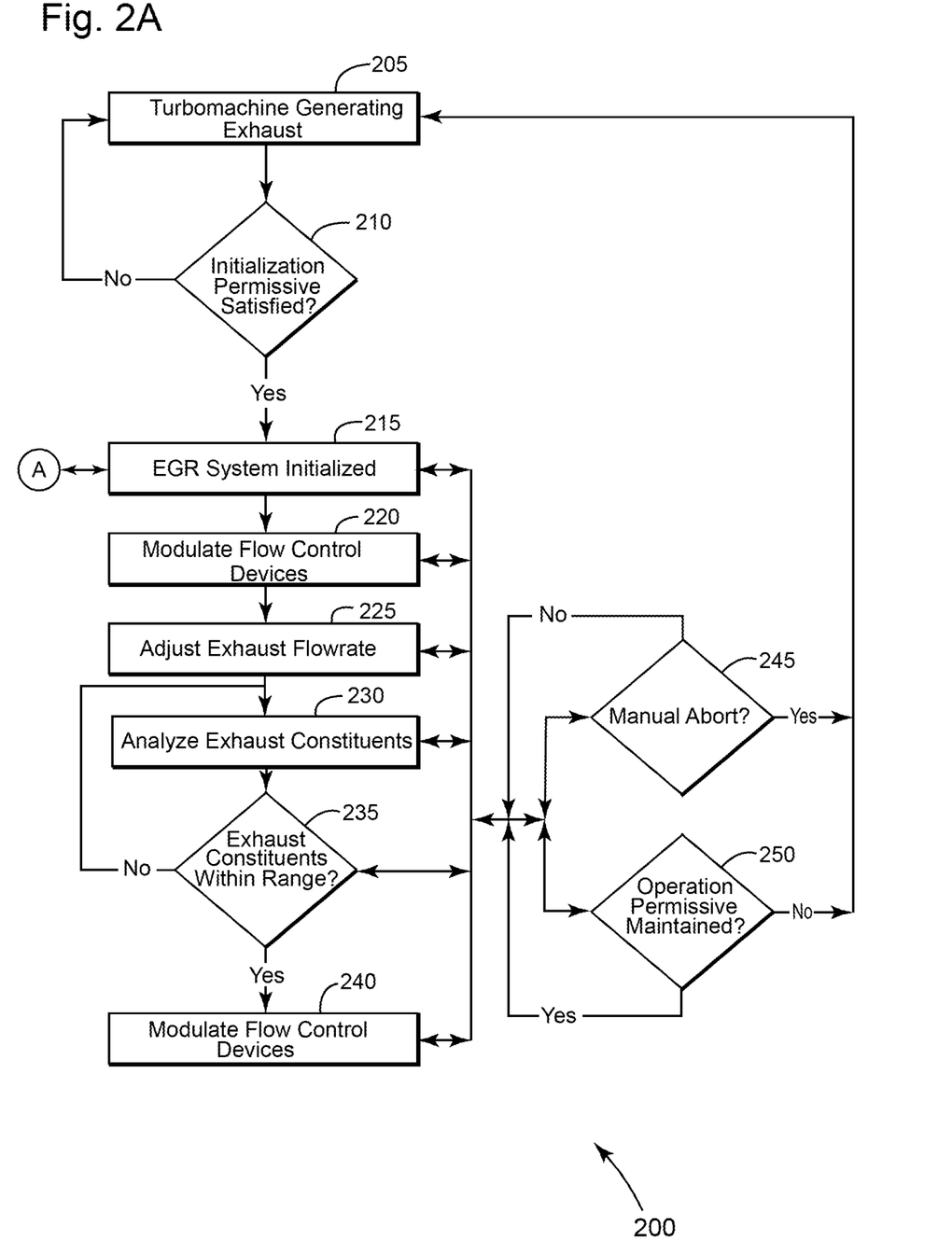
Figure 2B:
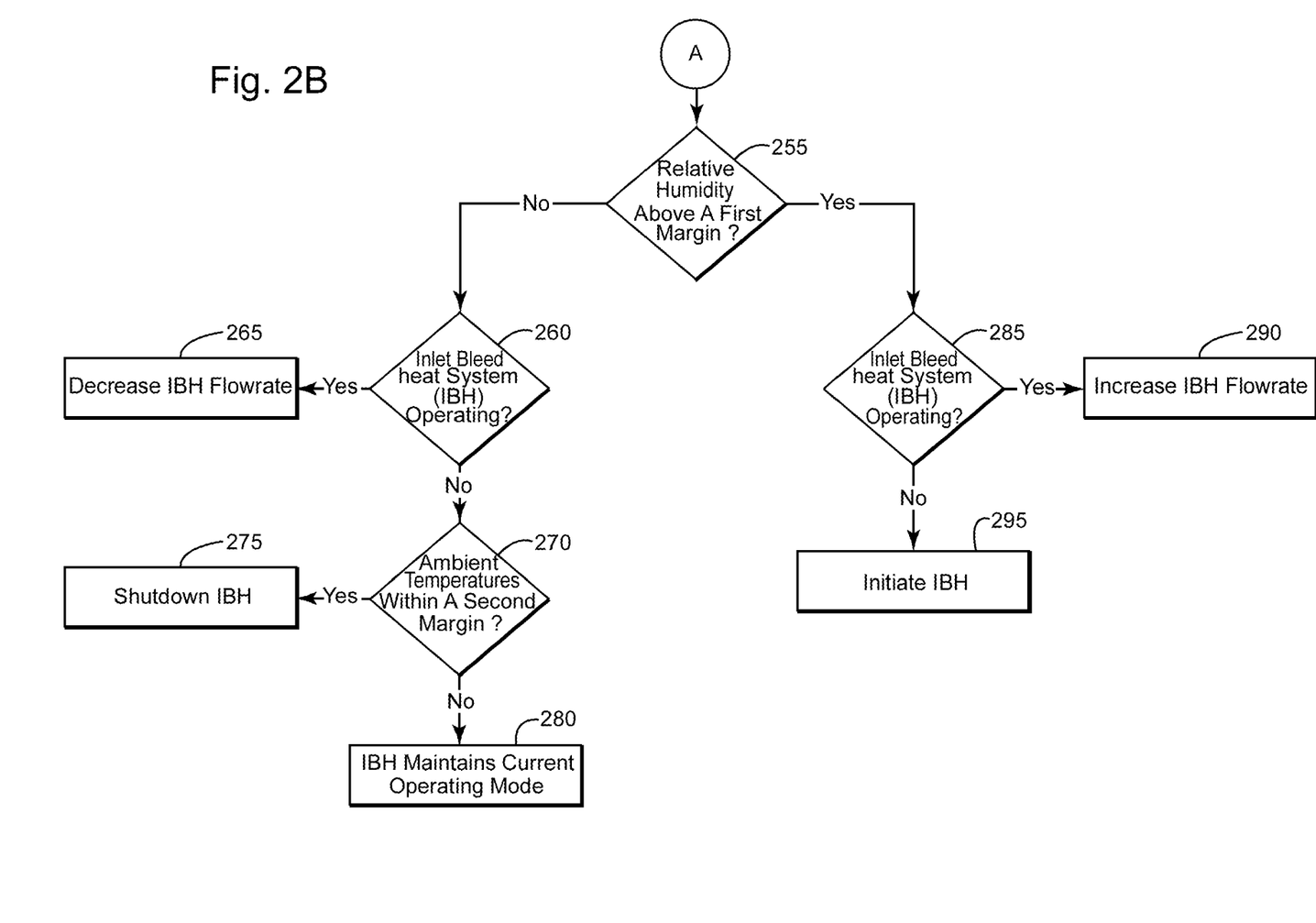

FIGS. 2A and 2B, collectively FIG. 2, is a flowchart illustrating a method of reducing the level of the liquid products derived from SOx emissions. In an embodiment of the present invention the EGR system 150 may be integrated with a graphical user interface (GUI), or the like. The GUI may allow the operator to navigate through the method 200 described below. The GUI may also provide at least one notification of the status of the EGR system 150.

In step 205, of the method 200, the turbomachine 100 generates an exhaust. Depending on either the type and/or operation of the turbomachine 100, the generated exhaust may have a flowrate, for example, but not limiting of, of about 10,000 Lb/hr to about 50,000,000 Lb/hr and a temperature of about 100 Degrees Fahrenheit to about 1500 Degrees Fahrenheit.

In step 210, the method 200 may determine whether at least one initialization permissive is satisfied. An embodiment of the present invention may require that the at least one initialization permissive is satisfied before the EGR system 150 begins to process the exhaust stream 165. The initialization permissive may generally be considered a permissive that confirms the turbomachine 100 and the EGR system 150 are ready to process the exhaust stream 165. In an embodiment of the present invention, the user may define the at least one initialization permissive.

The at least one initialization permissive may include at least one of: preheating status of the EGR system 150; operational readiness of the EGR system 150 components; status of at least one fault condition of the EGR system 150; and combinations thereof. If the at least one initialization permissive is satisfied then the method 200 may proceed to step 215; otherwise the method 200 may revert to step 205 until the at least one initialization permissive is satisfied.

In step 215, the method 200 may provide a notification to the user that the EGR system 150 is initialized and ready to process the exhaust stream 165. In an embodiment of the present invention, the GUI may provide the notification as a pop-up window, alarm, or other similar methods.

Here, the method 200 may proceed on at least two parallel paths. As illustrated in FIG. 2. After, the initialization permissive is satisfied, the method 200 may simultaneously proceed to step 215 and step 255.

In step 220, the method 200 may modulate at least one flow control device. A flow control device may be considered a component of the EGR system 150 that allows for the exhaust stream 165 to flow through certain portions of the EGR system 150. The at least one flow control device may have the form of the EGR damper 155, or the like.

The EGR damper 155 may divert a portion of the total exhaust 120 generated by the turbomachine 100 to the EGR system 150, where the diverted portion becomes the exhaust stream 165. For example, but not limiting of, the EGR damper 155 may open and allow for diversion of up to 45% of the total exhaust 120 to become the exhaust stream 165 for the EGR system 150 to receive the exhaust stream 165.

Referring now to step 225, where the method 200 may adjust the flowrate of the exhaust stream 165 within the EGR system 150. The method 200 may utilize at least one EGR control device (not illustrated) to adjust a flowrate of the exhaust stream 165. The EGR damper 155 may apportion up to about 45 percent of the total exhaust 120 to the exhaust stream 165. The efficiency of the EGR system 150 may be improved if the flowrate of the exhaust stream 165 is increased. The at least one EGR control device may allow the exhaust stream 165 to overcome the pressure drop of the EGR system 150, allowing for the at least one exhaust stream 165 to flow throughout the EGR system 150. The at least one EGR control device may have the form of a fan, blower, or other similar device, capable of increasing the flowrate of the exhaust stream 165.

The control system may be integrated with a plurality of pressure transmitters, or the like. The transmitters may be located throughout 150; and may determine the pressure drop within the EGR system 150. The control system may receive data on the pressure drop. The control system may then adjust the speed of the EGR control device to overcome the pressure drop, as needed.

In step 230, the method 200 may analyze the exhaust constituents to determine the likelihood of SOx constituents condensing and forming liquid products.

In step 235 the method 200 may determine whether the aforementioned constituents are within an acceptable range. The present invention may utilize a variety of sensors, thermocouples, and other similar devices to determine the concentration of constituents remaining in the exhaust stream 165. If the exhaust constituents are within the range then the method 200 may proceed to step 240; otherwise the method 200 may revert to step 235.

In step 240, the method 200 may modulate at least one flow control device to allow for the exhaust stream 165 to re-enter the turbomachine 100. After the method 200 determines that constituents are within the acceptable range, the aforementioned flow control devices may be modulated, as needed.

In step 245, the method 200 may allow for aborting the operation of the EGR system 150. As illustrated in FIG. 2, the operation of the EGR system 150 may be aborted after the EGR system 150 has been initialized in 215. An embodiment of the present invention, may allow for a user to manually abort the operation of the EGR system 150. Alternatively, the method 200 may be integrated with a system that allows for the automatic aborting of the operation of the EGR system 150. If the operation of the EGR system 150 is aborted, then the method 200 may revert to step 205, otherwise the method 200 proceeds to the next step.

In step 250, the method 200 may determine whether at least one operational permissive is maintained during the operation of the EGR system 150. Step 250 may be continuously monitoring the operation of the EGR system 150.

The operational permissive may include at least one of: an EGR fraction; a concentration range of at least one constituent; the EGR skid 175 is operating within an operational range; a status of at least one fault condition of the EGR system 150; a combustion dynamics margin; a compressor stall and/or surge margin; and combinations thereof.

In an embodiment of the present invention, the GUI may notify the user if the operational permissive is not maintained. In an alternate embodiment of the present invention, the method 200 may automatically revert to step 205 if the operational permissive is not maintained.

The EGR skid 175 may reduce the temperature of the exhaust stream 165 to around a saturation temperature. This may allow for the turbomachine 100 to maintain the steady gas turbine output by increasing inlet mass flow. Cooling of the exhaust stream 165 typically results in a higher mass flow of exhaust per unit volume entering the compressor 105. The cooling of the exhaust stream 165 may result in the turbomachine 100 generating a higher output and not experiencing a decrease in performance as may occur with a higher average inlet temperature of the inlet fluid.

The cooling process may also allow for the sequestration and removal of some of the concentrated SOx constituent in the exhaust stream 165. The EGR skid 175 may reduce the exhaust stream 165 to a range of about 35 degrees Fahrenheit to about 100 degrees Fahrenheit.

The method 200 may utilize additional components to remove particulates and/or other constituents from the exhaust stream 165. The additional components may also reduce the temperature of the exhaust stream 165 to allow for the particulate to be removed by condensation of the exhaust stream 165, during the aforementioned cooling process. The additional components may include at least one of the mixing station 180 and the mist eliminator 185; which were previously described.

An embodiment of the present invention may utilize the IBH system 190 in conjunction with the EGR system 150 to bring the SOx concentration within a desired range. As described below, the EGR skid 175 may remove a portion of the SOx containments. Then, the IBH system 190 may prevent the formation of Sulfuric Acid, which may form on the compressor 105 if the inlet fluid 125, comprising SOx, condenses.

An embodiment of the present invention may utilize at least one device to determine the wet-bulb and dry-bulb temperatures. These temperatures may be used to control the operation of the IBH system 190. Here, the valve 193 of the IBH system 190 may be adjusted to provide sufficient heat to maintain the temperature of the inlet fluid 125 above a condensation temperature. An example of this process is described in steps 255 through 295 of FIG. 2B.

In step 255, the method 200 may determine whether the relative humidity, wet bulb temperature, or the like is above a first margin. Here, the method 200 may receive data on the ambient conditions. This data may include the wet-bulb temperature, the dry bulb, temperature, or the like. The control system may seek to maintain a margin above the condensation temperature of the inlet fluid 125. For example, but not limiting of, the first margin may be approximately 5 degrees Fahrenheit or greater above a dew point temperature. If the ambient temperature is not above the first margin, then the method 200 may proceed to step 265; otherwise the method 200 may proceed to step 285.

In step 260, the method 200 may determine wherein an IBH system 190 is operating (as described) with the valve 193 at a minimum position. Here the method 200 may determine that too much IBH flow is being provided. If the IBH system 190 is operating then the method 200 may proceed to step 265; otherwise the method 200 may proceed to step 270.

In step 265, the method 200 may decrease the flowrate of the IBH system 190. Here the control system may stroke the valve 193 towards a closed position.

In step 270, the method 200 may determine whether the ambient temperature is within a second margin. Here, the method 200 may determine whether enough margin exists between the ambient temperatures and dew point to allow further closing of the valve 193. The second margin may be considered a minimum range that will maintain an allowable margin above the ambient dew point temperature. For example, but not limiting of, the second margin may be approximately 15 degrees Fahrenheit or greater above a dew point temperature. If the ambient temperature is within the second margin, then the method 200 may proceed to step 275; otherwise the method 200 may proceed to step 280.

In step 275, the method 200 may shutdown the IBH operation. This may increase the overall efficiency of the turbomachine 100 by reducing the amount of compressed air being extract from the compressor 105.

In step 280, the method 200 may allow the IBH system 190 to maintain the current operation. This may seek to ensure that the inlet fluid 125 is operating a temperature above the dew point, minimizing the likelihood of condensate forming in the compressor 105.

Referring now to step 285. The method 200, in step 255, may have determined that the ambient temperatures are not above a first margin. In step 285, the method 200 may determine whether the IBH system 190 is operating. The control system may receive feedback on the operational status on the IBH system 190. If the IBH system 190 is operational, then the method 200 may proceed to step 290; otherwise the method 200 may proceed to step 295.

In step 290, the method 200 may increase the IBH flowrate. Here, the control system may increase the stroke of the valve 193.

In step 295, the method 200 may initiate the operation of the IBH system 190. Here, the control system may increase the stroke of the valve 193 to the minimum position for IBH operation.

Figure 3:
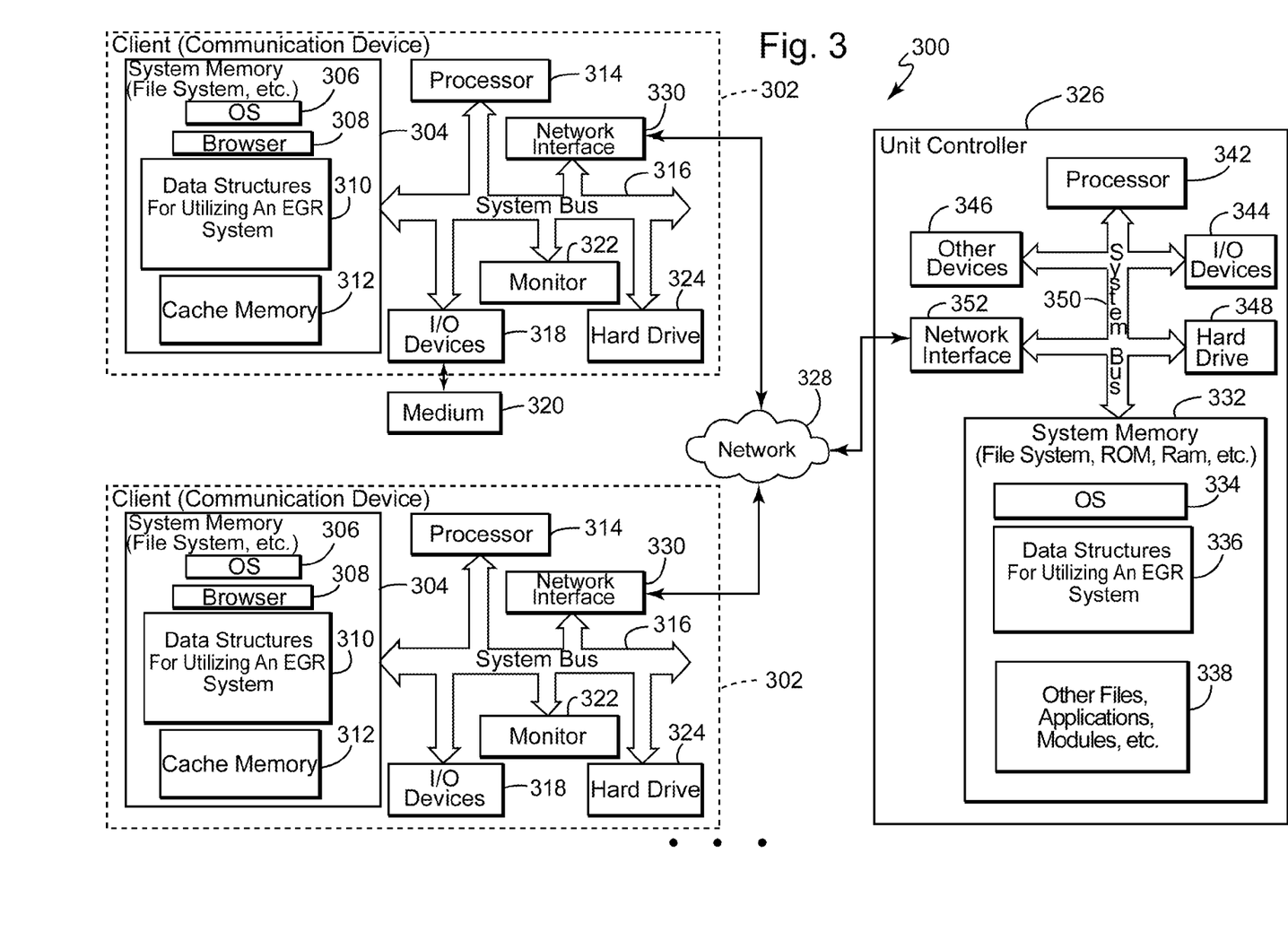
FIG. 3 is a block diagram of an exemplary system of utilizing an EGR system to reduce the level of the liquid products derived from SOx emissions in accordance with an embodiment of the present invention.

FIG. 3 is a block diagram of an exemplary system 300 of utilizing an EGR system to reduce the level of the liquid products derived from SOx emissions in accordance with an embodiment of the present invention. The elements of the method 200 may be embodied in and performed by the system 300. The system 300 may include one or more user or client communication devices 302 or similar systems or devices (two are illustrated in FIG. 3). Each communication device 302 may be for example, but not limited to, a computer system, a personal digital assistant, a cellular phone, or similar device capable of sending and receiving an electronic message.

The communication device 302 may include a system memory 304 or local file system. The system memory 304 may include for example, but is not limited to, a read only memory (ROM) and a random access memory (RAM). The ROM may include a basic input/output system (BIOS). The BIOS may contain basic routines that help to transfer information between elements or components of the communication device 302. The system memory 304 may contain an operating system 306 to control overall operation of the communication device 302. The system memory 304 may also include a browser 308 or web browser. The system memory 304 may also include data structures 310 or computer-executable code for utilizing an EGR system 150 that may be similar or include elements of the method 200 in FIG. 2.

The system memory 304 may further include a template cache memory 312, which may be used in conjunction with the method 200 in FIG. 2 for utilizing an EGR system 150.

The communication device 302 may also include a processor or processing unit 314 to control operations of the other components of the communication device 302. The operating system 306, browser 308, and data structures 310 may be operable on the processing unit 314. The processing unit 314 may be coupled to the memory system 304 and other components of the communication device 302 by a system bus 316.

The communication device 302 may also include multiple input devices (I/O), output devices or combination input/output devices 318. Each input/output device 318 may be coupled to the system bus 316 by an input/output interface (not shown in FIG. 3). The input and output devices or combination I/O devices 318 permit a user to operate and interface with the communication device 302 and to control operation of the browser 308 and data structures 310 to access, operate and control the software to utilize an EGR system 150. The I/O devices 318 may include a keyboard and computer pointing device or the like to perform the operations discussed herein.

The I/O devices 318 may also include for example, but are not limited to, disk drives, optical, mechanical, magnetic, or infrared input/output devices, modems or the like. The I/O devices 318 may be used to access a storage medium 320. The medium 320 may contain, store, communicate, or transport computer-readable or computer-executable instructions or other information for use by or in connection with a system, such as the communication devices 302.

The communication device 302 may also include or be connected to other devices, such as a display or monitor 322. The monitor 322 may permit the user to interface with the communication device 302.

The communication device 302 may also include a hard drive 324. The hard drive 324 may be coupled to the system bus 316 by a hard drive interface (not shown in FIG. 3). The hard drive 324 may also form part of the local file system or system memory 304. Programs, software, and data may be transferred and exchanged between the system memory 304 and the hard drive 324 for operation of the communication device 302.

The communication device 302 may communicate with at least one unit controller 326 and may access other servers or other communication devices similar to communication device 302 via a network 328. The system bus 316 may be coupled to the network 328 by a network interface 330. The network interface 330 may be a modem, Ethernet card, router, gateway, or the like for coupling to the network 328. The coupling may be a wired or wireless connection. The network 328 may be the Internet, private network, an intranet, or the like.

The at least one unit controller 326 may also include a system memory 332 that may include a file system, ROM, RAM, and the like. The system memory 332 may include an operating system 334 similar to operating system 306 in communication devices 302. The system memory 332 may also include data structures 336 for utilizing an EGR system 150. The data structures 336 may include operations similar to those described with respect to the method 200 for utilizing an EGR system 150. The server system memory 332 may also include other files 338, applications, modules, and the like.

The at least one unit controller 326 may also include a processor 342 or a processing unit to control operation of other devices in the at least one unit controller 326. The at least one unit controller 326 may also include I/O device 344. The I/O devices 344 may be similar to I/O devices 318 of communication devices 302. The at least one unit controller 326 may further include other devices 346, such as a monitor or the like to provide an interface along with the I/O devices 344 to the at least one unit controller 326. The at least one unit controller 326 may also include a hard disk drive 348. A system bus 350 may connect the different components of the at least one unit controller 326. A network interface 352 may couple the at least one unit controller 326 to the network 328 via the system bus 350.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also he noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of reducing a likelihood of a liquid product forming within an exhaust stream, wherein the exhaust stream is generated by a turbomachine; the method comprising: providing a turbomachine comprising:
   an inlet bleed heat (IBH) system for increasing a temperature of an inlet fluid, wherein the inlet fluid comprises an inlet air and an exhaust stream; wherein the IBH system comprises at least one valve;
   a compressor which receives and compresses the inlet fluid from the IBH system;
   a recirculation loop which recirculates the compressed inlet fluid from the compressor to the IBH system;
   providing at least one exhaust gas recirculation (EGR) system comprising at least one of: an EGR skid, and an EGR flow control device; wherein the EGR system operationally reduces a concentration of a SOx constituent within the exhaust stream;
   utilizing the IBH system to increase a temperature of the inlet fluid above a condensation temperature;
   operating the IBH system in a manner that maintains a temperature of the SOx constituent above a SOx condensation temperature to reduce a likelihood of formation Sulfuric Acid forming, wherein Sulfuric Acid accelerates corrosion and foulin~ on components of the compressor that ingests the inlet fluid; and
   modulating at least one flow control device to adjust a flowrate of the exhaust stream.

2. The method of claim 1, further comprising determining whether at least one ambient temperature is within a first margin.

3. The method of claim 2, wherein the at least one ambient temperature comprises at least one of: a dry bulb temperature, a wet bulb temperature, or combinations thereof.

4. The method of claim 2, wherein the first margin comprises a range of at least 5 degrees Fahrenheit above a dew point temperature.

5. The method of claim 2, wherein if the at least one ambient temperature is above the first margin then determining whether the IBH system is operating.

6. The method of claim 5 further comprising decreasing an IBH flowrate if the IBH system is operating.

7. The method of claim 5, further comprising determining if the at least one ambient temperature is within a second margin.

8. The method of claim 7, further comprising shutting down the IBH system if the at least one ambient temperature is within the second margin.

9. The method of claim 7, further comprising allowing IBH operation if the at least one ambient temperature is above a second margin.

10. The method of claim 7, wherein the second margin comprises a range of at least 15 degrees Fahrenheit above a dew point temperature.

11. The method of claim 2, wherein the at least one ambient temperature is within the first margin and then determining whether the IBH system is operating.

12. The method of claim 8 further comprising increasing an IBH flowrate if the IBH system is operating.

13. The method of claim 8, further comprising initiating the operation of the IBH system.

14. The method of claim 1 further comprising: receiving at least one measurement of a dew point temperature.

15. The method of claim 1 further comprising: receiving at least one measurement of an ambient temperature.

16. The method of claim 14 further comprising determining at least one of: a dry-bulb temperature, a wet-bulb temperature, or combinations thereof.

* * * * *